United States Patent [19]

Choe et al.

[11] Patent Number: 5,773,144
[45] Date of Patent: Jun. 30, 1998

[54] RUBBER-POLYESTER COMPOSITES INCLUDING A FUNCTIONALLY TERMINATED COPOLYESTER

[75] Inventors: Eui Won Choe, Randolph; Charles Edward Forbes, Bridgewater, both of N.J.; Jennifer Ann Filbey, Charlotte; Stephan Fredrick Sherriff, Salisbury, both of N.C.

[73] Assignee: Hoechst Celanese Corp., Somerville, N.J.

[21] Appl. No.: 548,635

[22] Filed: Oct. 26, 1995

[51] Int. Cl.$^6$ .............. D02G 3/36; B32B 25/08; B32B 27/08

[52] U.S. Cl. .............. 428/373; 428/395; 428/483; 428/902; 528/302; 528/305; 528/308; 528/308.6

[58] Field of Search .............. 428/364, 373, 428/376, 374, 378, 392, 394, 395, 292, 294, 295, 343, 353, 377, 480, 483, 521, 902; 528/302, 308, 308.1, 308.6, 305

[56] References Cited

U.S. PATENT DOCUMENTS

| | | | |
|---|---|---|---|
| 4,082,731 | 4/1978 | Knopka | 260/75 T |
| 4,835,055 | 5/1989 | Kumakawa | 428/378 |
| 4,888,381 | 12/1989 | Pankratz | 524/751 |
| 5,151,142 | 9/1992 | Imai et al. | 152/565 |
| 5,219,636 | 6/1993 | Golz | 428/193 |
| 5,453,321 | 9/1995 | Choe et al. | 428/364 |

FOREIGN PATENT DOCUMENTS 0 591 843 A1  4/1994  European Pat. Off. .

Primary Examiner—Paul J. Thiobodeau
Assistant Examiner—Vivian Chen
Attorney, Agent, or Firm—John M. Genova

[57] ABSTRACT

A rubber-polyester composite comprising a rubber and a core-and-sheath heterocomponent fiber wherein the fiber core is formed from a linear polyester derived from an alkyl glycol and an aromatic diacid, and wherein the fiber sheath is formed from a compatibilizing acid-terminated or isocyanate-terminated polyester. The fiber sheath may also be composed of a blend of a thermoplastic elastomer and the compatibilizing polyester.

12 Claims, 3 Drawing Sheets

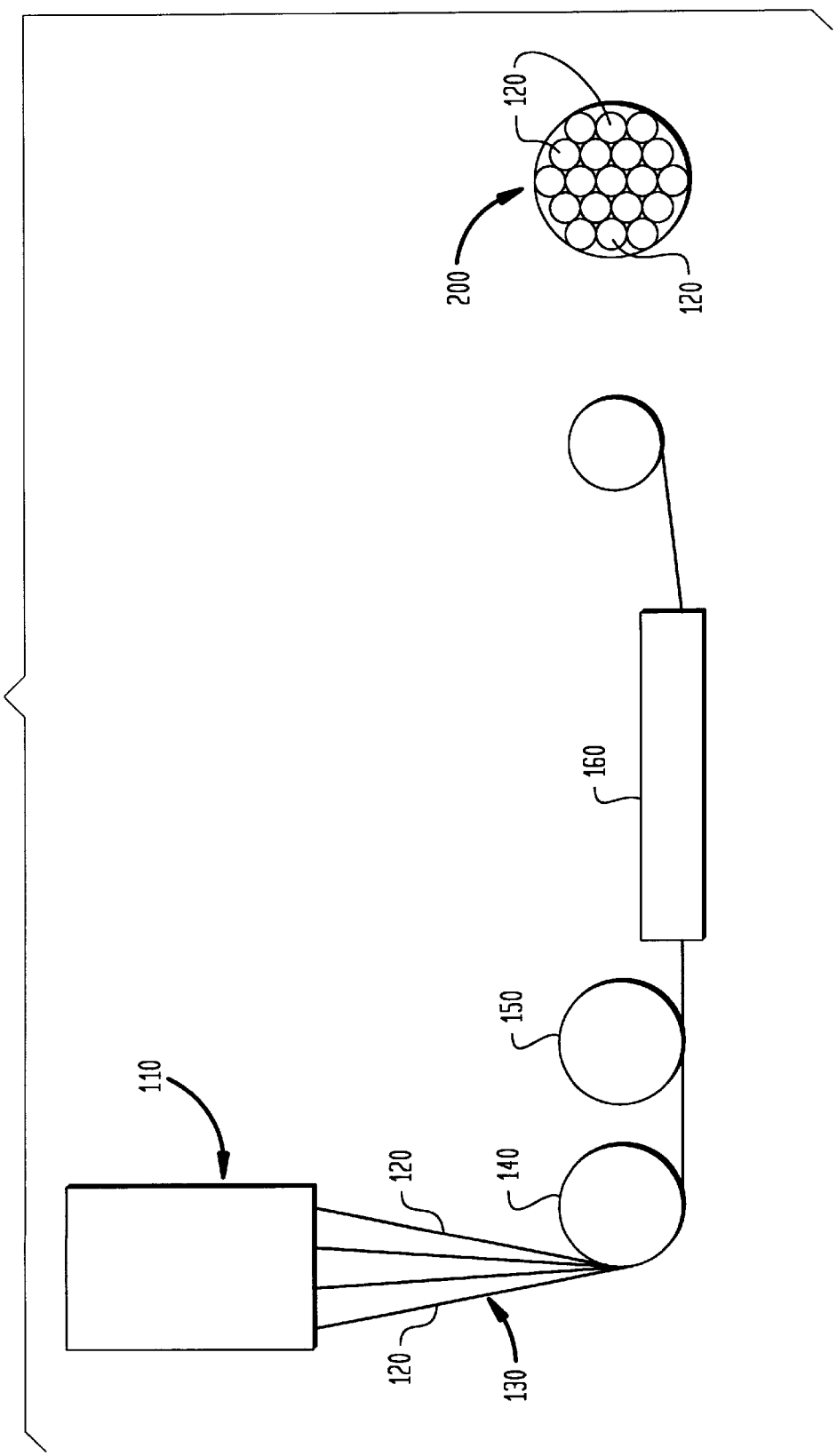

RUBBER-POLYESTER COMPOSITES INCLUDING A FUNCTIONALLY TERMINATED COPOLYESTER

TECHNICAL FIELD

The present invention relates generally to rubber/polyester composites and more specifically to rubber/polyester composites including a compatibilizing polymer produced by reacting a hydroxy-terminated polyester with a diisocyanate or an unsaturated acid anhydride. Additional components may be added as desired.

CROSS REFERENCE TO RELATED CASES

The subject matter of this application relates to the subject matter of the following cases being filed concurrently herewith:

1. U.S. Pat. No. 5,624,754, entitled RUBBER-POLYESTER COMPOSITES INCLUDING A SIDECHAIN CONTAINING COPOLYESTER.
2. U.S. Pat. No. 5,597,651, entitled RUBBER-POLYESTER COMPOSITES INCLUDING POLYSTYRENE-POLYESTER COPOLYMERS.
3. U.S. Pat. No. 5,654,097, entitled HETEROFILAMENT AND FUSED CORD THEREOF.

BACKGROUND

Non-metallic fibers useful for rubber reinforcement and especially for tire reinforcement include relatively high denier nylons, rayon, as well as polyester. A particularly preferred polyester is poly(ethylene terephthalate). Because mechanical properties are important, it is typical to employ yarns made up of highly oriented filament which may be prepared in a variety of ways. With respect to poly(ethylene terephthalate) one process involves spinning the yarn to a relatively low birefringence (<0.009) and then drawing the yarn. For example see: U.S. Pat. Nos. 3,216,187 or 3,361,859. Another process involves spinning the yarn to a relatively higher birefringence (i.e. 0.009) and drawing off-line. For example see: U.S. Pat. No. 4,973,657. Another process involves spinning the yarn and subsequently draw-twisting the yarn. The preferred process involves spinning the yarn to a relatively high birefringence (i.e. 0.009) and drawing in-line. For example see: U.S. Pat. Nos. 4,101,525; 4,195,052, 4,414,169; 4,690,866; 4,551,172; 4,827,999; 4,491,657, 5,067,538, 5,132,067; and 5,234,764. Preparation of the yarn is merely the first step, since the yarns must be suitably adhered to the rubber components in order to impart the desired properties to the end product.

In connection with tire manufacture, it is typical to manufacture specialized fabrics which are coated with rubber for use in plies, breakers, chippers and belts. Initial manufacture consists of spinning and drawing the yarns as noted above as well as applying a finish. The yarn is twisted into plies, cabled into cords, woven into fabrics, and treated with an adhesive dip prior to being coated with rubber. To facilitate processing with adhesives and calendaring with rubber, the cables are woven into a fabric, for example of 23–35 ends per inch with a minimum number of filament yarns or staple fiber pick threads, also called fill threads or weft. The fabric is dip-coated with an adhesive which bonds with rubber. The adhesives are most commonly aqueous systems including rubber latex, resorcinol and formaldehyde which are allowed to partially react before dip application.

The multi-step yarn pre-treatment process involved in tire manufacture is of course expensive, both in terms of capital expenditure and processing costs; especially in connection with weaving, adhesive application, and environmental control costs, which expenses are interrelated inasmuch as the weaving step is required in large part to facilitate adhesive application.

Bilayer spinning of synthetic fibers has been employed to provide fibers with a surface layer more suitable for a given end use. Rayon/nylon bicomponent fibers are shown, for example, in U.S. Pat. No. 5,272,005; while U.S. Pat. No. 5,227,109 discloses bicomponent fibers with a poly(ethylene terephthalate) core and a copolyester sheath. Perhaps more notably, U.S. Pat. No. 4,987,030 shows a polyester core/nylon sheath bicomponent fiber useful as rubber reinforcement. Additional multilayer fibers and cords may be seen in the following U.S. Pat. Nos. 4,520,066; 4,129,692; 4,024,895; 3,839,140; 3,645,819.

Generally, rubber/polyester composites such as reinforced fabrics and tires preferably include some type of compatibilizer, whether or not the polyester is in fibrous form.

SUMMARY OF INVENTION

There is provided in accordance with the present invention a multi-component rubber-polyester composite comprising in adherent contact a rubber component, a linear polyester of an alkyl glycol and an aromatic diacid as well as an unsaturated acid or isocyanate terminated polyester.

The isocyanate or unsaturated acid terminated polyester is typically prepared from a diisocyanate or an unsaturated acid anhydride and a hydroxy terminated polyester and has the formula:

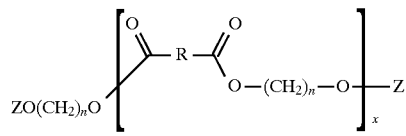

wherein Z represents the reaction residue of a diisocyanate or an unsaturated acid, x is an integer from 5 and above, R is one or more arylene units and n is an integer from 2–10.

In general x is greater than 10 and less than 100,000, with from about 50 to 15,000 being typical. From about 100 to about 10,000 are however preferred values.

The composites of the invention may be fiber-reinforced composites as in the case of tires and the like, or simply melt blends of the various components. In a further aspect of the invention, isocyanate-terminated polyesters are claimed.

BRIEF DESCRIPTION OF THE DRAWINGS

The invention is described in detail below in connection with various synthetic examples and drawings. In the drawings:

FIG. 4 is a schematic diagram showing the manufacture of fused tire cord.

DETAILED DESCRIPTION

Figure 1:
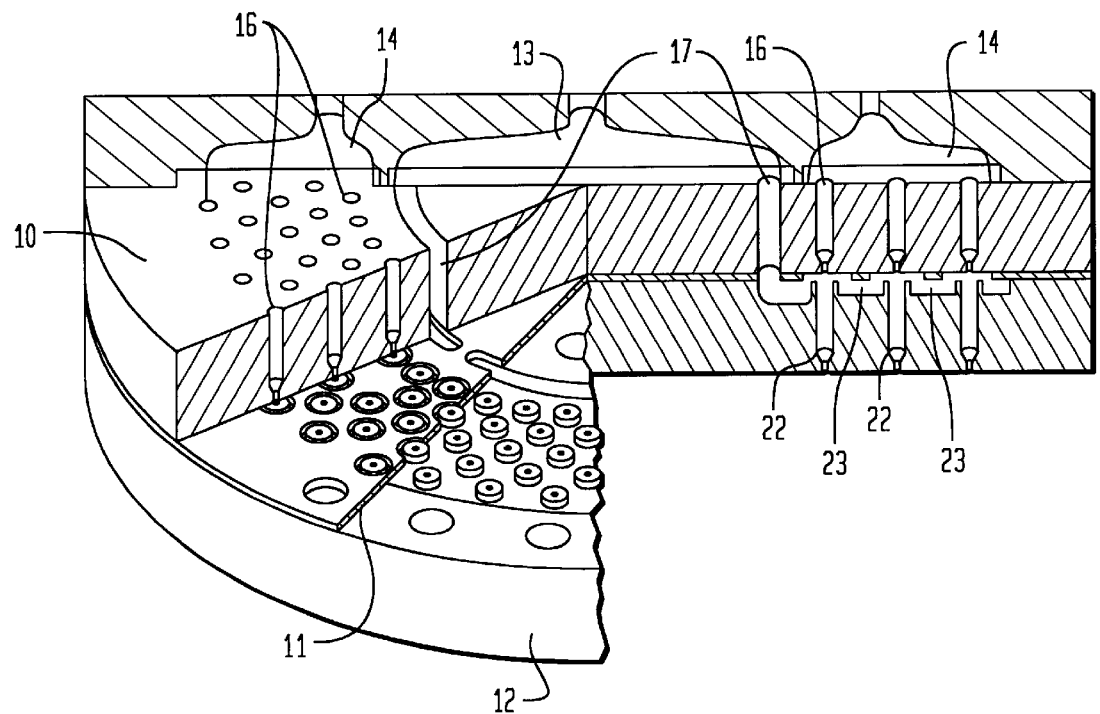
FIG. 1 is a view in perspective and partial section of a spin pack assembly.

The present invention is described in detail below in connection with numerous examples which are provided for purposes of illustration only and are not intended to limit the invention in any way, which invention is defined in the appended claims. The polyesters may be polyesters of different molecular weights for example, depending on the desired properties. Polyesters may be prepared from the dimethyl esters of an aromatic diacid and a glycol or directly from the acid and the glycol if so desired. If a particularly high molecular weight product is desired, it is customary to subject an intermediate or high molecular weight polyester product to solid state polymerization under vacuum or in an inert atmosphere.

Linear polyesters which may be employed in practicing the present invention include polyesters of alkyl glycols and aromatic acids such as: poly(alkylene terephthalates) having the repeating unit

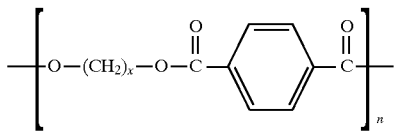

where X=2–10 and preferably 2–4 and n is an integer throughout this section;
copolymers including (alkylene isophthalates) having the repeating unit

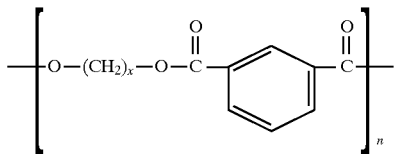

where X=2–6 and preferably 2 or 4;
poly(alkylene 4,4' bibenzoates) having the repeating unit

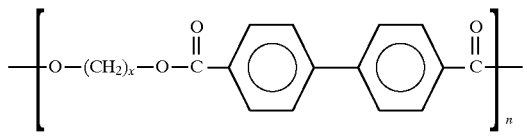

where X=2–10 with X=2–6 being preferred;
poly(alkylene 2,6 naphthalene-dicarboxylates) having the repeating unit

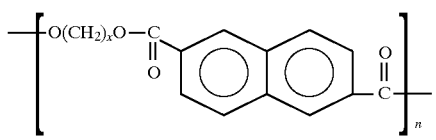

where X=2–10 and preferably 2–4;
poly(alkylene sulfonyl-4,4'-dibenzoates having the repeating unit

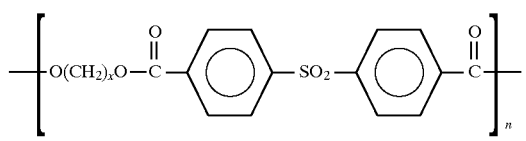

where X=2–10, preferably 2–6;
poly(p-phenylene alkylene dicarboxylates) having the repeating unit

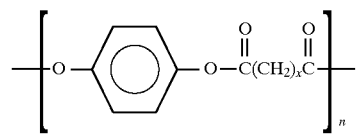

where X=1–8 and preferably 1–4;
Poly(p-xylylene aklylene dicarboxylates) having the repeating unit:

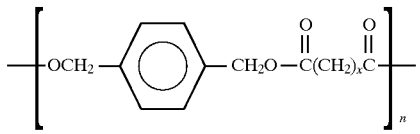

where X=1–10 and preferably 2;
as well as Poly(p-phenylene dialkylene terephthalates) having the repeating unit

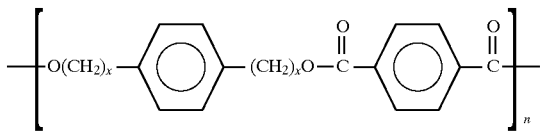

where X=1–5 and preferably 1,2 and 4.

As will be appreciated by those of skill in the art, the foregoing list is by no means exhaustive and it is sometimes desired to employ terepolymers and linear polyesters with even more monomers. Particularly desirable terepolymers might include poly(alkylene terephthalate-co-4,4'-bibenzoate), and poly(alkylene 4,4'-bibenzoate-co-2,6-naphthalene dicarboxylates). These polymers are disclosed in U.S. Pat. Nos. 3,008,934, 4,082,731 and 5,453,321 as well as European Application No. 0 202 631. The molecular weight, spinning, drawing fibers and the like will depend on the desired end-use of the product.

So also, other monomeric components may be utilized in the polymers. Cyclohexanedimethanol, available from Eastman Chemical Company may be used in polyesters in accordance with the present invention. Cyclohexanedimethanol may be employed in the cis or trans form.

Any suitable, melt processable rubber may be employed such as natural rubber, synthetic 1,4-polyisoprene, polybutadiene rubber, poly(butadiene-co-styrene), poly(isobutylene-co-isoprene), poly(ethylene-co-propylene-co-diene), styrene-isoprene rubbers and the like if the rubber is melt-processable under the conditions of interest. Particularly preferred rubbers are block copolymer rubbers, also referred to as thermoplastic elastomers herein and further described below. Ethylene-propylene rubbers (EPR) or ethylene-propylene-diene monomer (EPDM) rubbers are important commercial materials which may also be employed under suitable conditions.

Generally speaking, the thermoplastic elastomers useful in connection with the present invention are multiphase compositions in which the phases are intimately dispersed. In many cases, the phases are chemically bonded by block or graft copolymerization. In others, a fine dispersion is apparently sufficient. At least one phase consists of a material that is hard at room temperature but fluid upon heating. Another phase consists of a softer material that is rubberlike at room temperature. A simple structure is an A-B-A block copolymer, where A is a hard phase and B an elastomer or soft phase, eg, poly(styrene-elastomer-styrene).

Most polymers are thermodynamically incompatible with other polymers, and mixtures separate. This is true even when the polymeric species are part of the same molecule, as in these block copolymers. With respect to poly(styrene-elastomer-styrene) copolymers, the polystyrene and segments form separate regions, ie, domains, dispersed in a continuous elastomer phase. At room temperature, these polystyrene domains are hard and act as physical cross-links, tying the elastomer chains together in a three-dimensional network. In some ways, this is similar to the network formed by vulcanizing conventional rubbers using sulfur cross-links. The main difference is that in thermoplastic elastomers, the domains lose their strength when the material is heated or dissolved in solvents. This allows the polymer or its solution to flow. When the material is cooled down or the solvent is evaporated, the domains harden and the network regains its original integrity. This explanation of the properties of thermoplastic elastomers has been given in terms of a poly(styrene-elastomer-styrene) block copolymer, but it would apply to any block copolymer with the structure A-B-A; A-B diblock or $(A-B)_n$ repeating block polymers or multiblock. In principle, A can be any polymer normally regarded as a hard thermoplastic, eg, polystyrene, poly(methyl methacrylate), polypropylene, and B can be any polymer normally regarded as elastomeric, eg, polyisoprene, polybutadiene, polyisobutylene, polydimethylsiloxane (see Table 1). Note also that a styrene-ethylene butylene-styrene (SEBS) saturated elastomer type polymer may be used in connection with the present invention.

Particularly preferred commercially available block copolymer thermoplastic elastomers appear in Table 2 below.

TABLE 2

TRADE NAMES AND MANUFACTURERS OF THERMOPLASTIC ELASTOMERS

| Trade Name | Manufacturer | Type | Hard segment | Soft segment |
|---|---|---|---|---|
| Kraton D | Shell Chemical Co. | triblock (S-B-S or S-I-S) | S | B or I |
| Solprene 400 | Phillips Petroleum Co. | branched $(S-B)_n(S-I)_n$ | S | B or I |
| Stereon | Firestone Co. | triblock (S-B-S) | S | B |
| Tufprene | Asahi | triblock (S-B-S) | S | B |
| Europrene SOL T | Enichem | triblock (S-B-S) or (S-I-S) | S | B or I |
| Kraton G | Shell Chemical Co. | triblock (S-EB-S) | S | EB |
| Elexar | Shell Chemical Co. | triblock (S-EB-S) and (S-B-S) | S | EB or B |
| Riteflex | Hoechst Celanese | | polyester | polyether |

S = Polystyrene; B = Polybutadiene I = Polyisoprene, EB = Poly(ethylene-co-butylene)

Riteflex is a multiblock $(A-B)_n$ type elastomer wherein, A the hard segment is poly(butylene terephthalate) and B, the soft segment is poly(tetramethylene ether).

Rubbers useful in connecting with the present invention are those which are easily melt-processed with the polyester, for example, which may be melt blended and co-extruded with a polyester forming the sheath of a heterofilament. Rubbers such as natural rubber or synthetic cis-isoprene rubber may be employed provided they have suitable flow characteristics.

Especially preferred thermoplastic elastomers are the styrene-elastomer-styrene block copolymers described above.

The functionally terminated polyester component of the present invention preferably has a melting point well below the linear polyester component, especially if it is desired to make a fused cord as hereinafter described. Preferably the functionally-terminated polyester is fully melted at least 5° C. below the crystalline melting point of the linear polyester component, from 10°–150° C. being more typical and from 15°–50° C. below being still more typical. Particular polymers useful for blending with poly(ethylene terephthalate) and rubber are exemplified in examples 1–4 below.

EXAMPLE 1—MALEIC ACID TERMINATED COPOLYESTER

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4 butanediol, 0.173 grams titanium tetraisopropoxide. The mixture was heated at 210° C. for 2 hours while distilling out methanol. The resulting mixture was heated to 250° C. for 30 minutes, and then vacuum was applied for 2 hours. After vacuum was released and replaced with nitrogen, maleic anhydride (9.02 grams, 0.092 moles) was added into the flask. The resulting polymer was stirred for 45 minutes at 250° C., and then was cooled to room temperature to obtain maleic acid terminated copolyester with an intermediate molecular weight, I.V. 0.57 dL/g as determined at 25° C. and 0.1% concentration in HFIP/PFP 50/50; Tmp 223° C. by DSC; heat of fusion 48 j/g; Tg 47° C.

TABLE 1

THERMOPLASTIC BLOCK COPOLYMERS

| Hard segment, A | Soft or elastomeric segment, B | Typical Structure |
|---|---|---|
| polystyrene | polybutadiene, polyisoprene | A—B—A |
| poly(α-methylstyrene) | polybutadiene, polyisoprene | A—B—A |
| polystyrene | poly(ethylene-co-butylene) | A—B—A |
| polyethylene | poly(ethylene-co-butylene) | A—B—A |
| polystyrene | polydimethylsiloxane | A—B—A |
| poly(α-methylstyrene) | polydimethylsiloxane | A—B—A and $(A-B)_n$ |
| polysulfone | polydimethylsiloxane | $(A-B)_n$ |
| poly(silphenylene siloxane) | polydimethylsiloxane | $(A-B)_n$ |
| polyurethane | polyester or polyether | $(A-B)_n$ |
| polyester | polyether | $(A-B)_n$ |
| polycarbonate | polydimethylsiloxane | $(A-B)_n$ |
| polycarbonate | polyether | $(A-B)_n$ |

The three commercially important block copolymers are poly(styrene-elastomer-styrene), thermoplastic polyurethanes, and thermnoplastic polyesters.

EXAMPLE 2—MALEIC ACID TERMINATED COPOLYESTER

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol and 0.173 grams of titanium tetraisopropoxide. The mixture was heated at 210° C. for 2 hours while distilling out methanol. The resulting mixture was heated at 250° C. for 30 minutes, and then vacuum was applied for 3 hours. After vacuum was released and replaced with nitrogen, maleic anhydride (3.08 grams, 0.0314 moles) was added into the flask. The resulting polymer was stirred for 10 minutes at 250° C., and then was cooled to room temperature to obtain maleic acid terminated copolyester with an intermediate molecular weight, I.V. 0.66 dL/g as determined at 25° C. and 0.1% concentration in HFIP/PFP 50/50: Tmp 224° C. (by DSC); heat of fusion 41 j/g; Tg 53° C.

EXAMPLE 3—ISOCYANATE TERMINATED COPOLYESTER

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol and 0.173 grams of titanium tetraisopropoxide. The mixture was heated at 210° C. for 2 hours while distilling out methanol. The resulting mixture was heated at 250° C. for 30 minutes, and then vacuum was applied for 2 hours. After vacuum was released and replaced with nitrogen, 2,4-toluenediisocyanate (16.02 grams, 0.092 moles) was added into the flask. The resulting polymer was stirred for 40 minutes at 250° C., and then was cooled to room temperature to obtain phenyl isocyanate terminated copolyester with an intermediate molecular weight, I.V.1.18 dL/g as determined at 25° C. and 0.1% concentration in HFIP/PFP 50/50; Tmp 220° C.; heat of fusion 38 j/g; Tg 55° C.

EXAMPLE 4—ISOCYANATE TERMINATED COPOLYESTER

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol and 0.173 grams of titanium tetraisopropoxide. The mixture was heated at 210° C. for 2 hours while distilling out methanol. The resulting mixture was heated at 250° C. for 30 minutes, and then vacuum was applied for 3 hours. After vacuum was released and replaced with nitrogen, 2,4-toluenediisocyanate (5.48 grams, 0.0314 moles) was added into the flask. The resulting polymer was stirred for 10 minutes at 250° C., and then was cooled to room temperature to obtain phenyl isocyanate terminated copolyester with an intermediate molecular weight, I.V. 1.98 dL/g as determined at 25° C. and 0.1% concentration in HFIP/PFP 50/50; Tmp 220° C.; heat of fusion 37 j/g; Tg 47° C.

As one of skill in the art will appreciate, a variety of acid anhydrides can be substituted for maleic anhydride in Example 1 or Example 2. Corresponding polymers can be readily prepared by substituting, for example, itaconic anhydride, citraconic anhydride or endo-5-norbornene-2,3-dicarboxylic anhydride. Likewise, polymers corresponding to the polymers prepared in accordance with Examples 3 and 4 are readily prepared by substituting methylene diisothiocyanate, a phenyl-blocked diisocyanate such as monophenyl blocked toluene diisocyanate, a commercially available diisocyanate such as the Bayer products Desmodur®1 (IPDI), Desmodur®W ($H_{12}$MDI), Desmodur®H (HDI), Mondur®M (MDI), or Mondur®TD (TDI). Moreover, the following known isocyanates may also be employed: 1-chloro-2,4-meta or para-phenylene diisocyanate, 4,4'-methylene bis(phenyl isocyanate), 2,4-tolylene diisocyanate, 2,6-tolylene diisocyanate, 3'3'-dimethyl-4,4'-biphenylene diisocyanate, , 4,4-methylene bis (methylphenyl isocyanate), 3,3'-dimethoxy-4,4'-biphenylene diisocyanate, hexamethylene diisocyanate as well as mixtures of the foregoing.

Filament and Cord Manufacture

Bilayer filaments in accordance with the present invention may be manufactured by any suitable technique. Preferred methods include those described in U.S. Pat. No. 4,101,525 to Davis et al for a high modulus low-shrinkage polyester yarn and U.S. Pat. No. 5,256,050 to Davies for bilayer filaments. Particularly preferred fibers and yarns are prepared by way of high stress melt spinning followed by drawing in the solid state. Generally speaking, such yarns have a tenacity of at least 7.5 grams per denier and an initial modulus of at least 100 grams per denier. The individual filaments have a denier of from about 2 to about 15 and yarns are made up of from about 6 to about 600 individual filaments. Filaments and yarn of the present invention are fabricated as described below, or one could prepare a bicomponent yarn and subsequently calendar the yarn directly with rubber, i.e. without a rubber sheath component.

Referring to the accompanying drawings and more specifically to FIG. 1, a bicomponent filament spin pack assembly is fabricated from a distributor 10, a shim 11 and a spinneret 12. Distributor 10 is positioned so as to receive melt-extruded sheath material through a channel 13 and melt-extruded core material through channel 14. Each of the sheath and core material are passed to the respective channels 13 and 14 by conventional melt extrusion, pump and filter means not herein illustrated.

The distributor 10 functions to form the core polymer into filaments and to channel the flow of sheath polymer mixture to spinneret 12. The core polymer or polymer mixture as the case may be is pumped through multiple passages 16 to the lower, even surface of distributor 10. Passages 16 can be arranged in any number of rows or columns depending upon their size, the viscosity of the polymer, the length of passages 16 and the flow characteristics of the particular core mixture. The bottom of each passage 16 is tapered to provide a core filament of the desired diameter. Although not to be limited thereto,, the density of passages 16 in the distributor 10 when, for example, the core material is melted polyethylene terephthalate and the exit passage diameter is in the range from 0.1 millimeter (mm) to 1.0 mm, can be such that each passage utilizes 10 square mm of the spinneret area.

Sheath polymer mixture flowing through channel 13 is pumped to passages 17 and through passages 17 to spinneret 12. Although not to be limited thereto, the passages 17 are preferably axially positioned in distributor 10 so that upon exiting passages 17 the sheath polymer will flow radially outwardly toward the inlets of passages 22.

Figure 2:
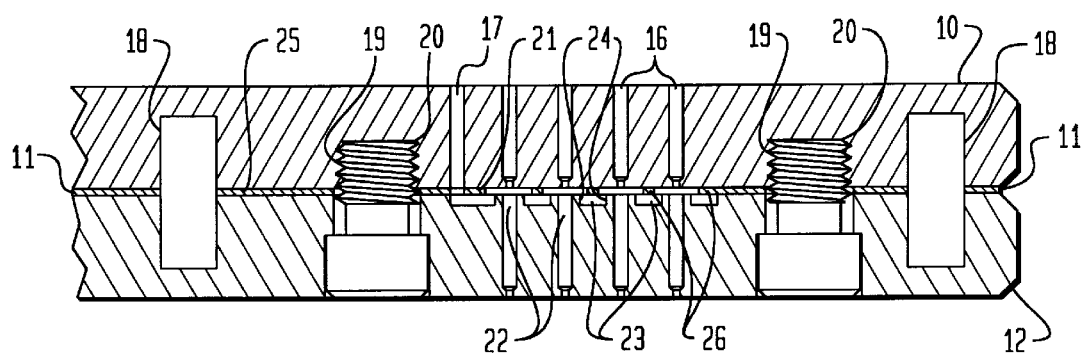
FIG. 2 is a view in vertical section of a portion of the spin pack assembly of FIG. 1.

A shim 11 is positioned between distributor 10 and spinneret 12 and maintained in fixed relationship to distributor 10 and spinneret 12 by bolts 19 engaging threaded recesses 20 in distributor 10. Distributor 10 and spinneret 12 are relatively positioned by dowel pins 18. In order to overcome bowing and separation of distributor 10 and spinneret 12 which can occur in the operation of conventional spin pack assemblies, a ring of bolts 19 has been positioned in the center of the assembly as shown in FIG. 2. The shim can be fabricated from a variety of materials such as stainless steel or brass with stainless steel being preferred.

The shim can be constructed as a single unit or in two separate inner and outer pieces. The number and positioning of bolts 19 is such as to control deflection, preferably limiting deflection to less than 0.002 mm.

Shim 11 must be of substantially constant thickness, preferably having a variance in thickness of less than 0.002 mm and the circular openings 21 must be in proper alignment with distributor passages 16 and spinneret passages 22. Shims 11 of different thicknesses, normally ranging from 0.025 to 0.50 mm, are employed to adjust for changes in sheath mixture viscosity, changes in polymer flux or to change the pressure drop.

The top smooth, even surface of the spinneret 12 is recessed, providing a channel 23 for the flow of sheath mixture to each passage 22. Raised circular portions or buttons 24 surround each passage 22. The raised portions or buttons 24 project upwardly from channel 23 to a height which is equal to the top surface 25 of spinneret 12. The rate of outward flow of sheath polymer or polymer mixture through channel 23 and over the buttons 24 to passages 22 is a result of the pressure drop determined by the thickness of shim 11. The pressure drop is inversely proportioned to the third power of the height of the gap 26 between distributor 10 and spinneret 12. Close control of this gap height is effected by shim 11 and maintained by the inner circle of bolts 19. The recess depth of channel 23 is selected so as to provide a low pressure drop (normally 20–50 psi) radically across the top of the spinneret. The shim thickness is selected to normally provide a 100–1000 psi pressure drop across the raised buttons 24.

As will be evident from the drawings, each passage 22 must be in concentric alignment with its corresponding passage 16. The core polymer flows through passages 16 and passages 22, exiting spinneret 12 as the core of a bicomponent fiber. The sheath material through passages 17, channel 23 and gap 26 to form a sheath about the core producing the aforementioned bilayer fiber. The center axis of distributor passage 16 should be within a circle having a radius less than 200 microns, preferably less then 50 microns from the center axis of the spinneret counterbore.

Figure 3:
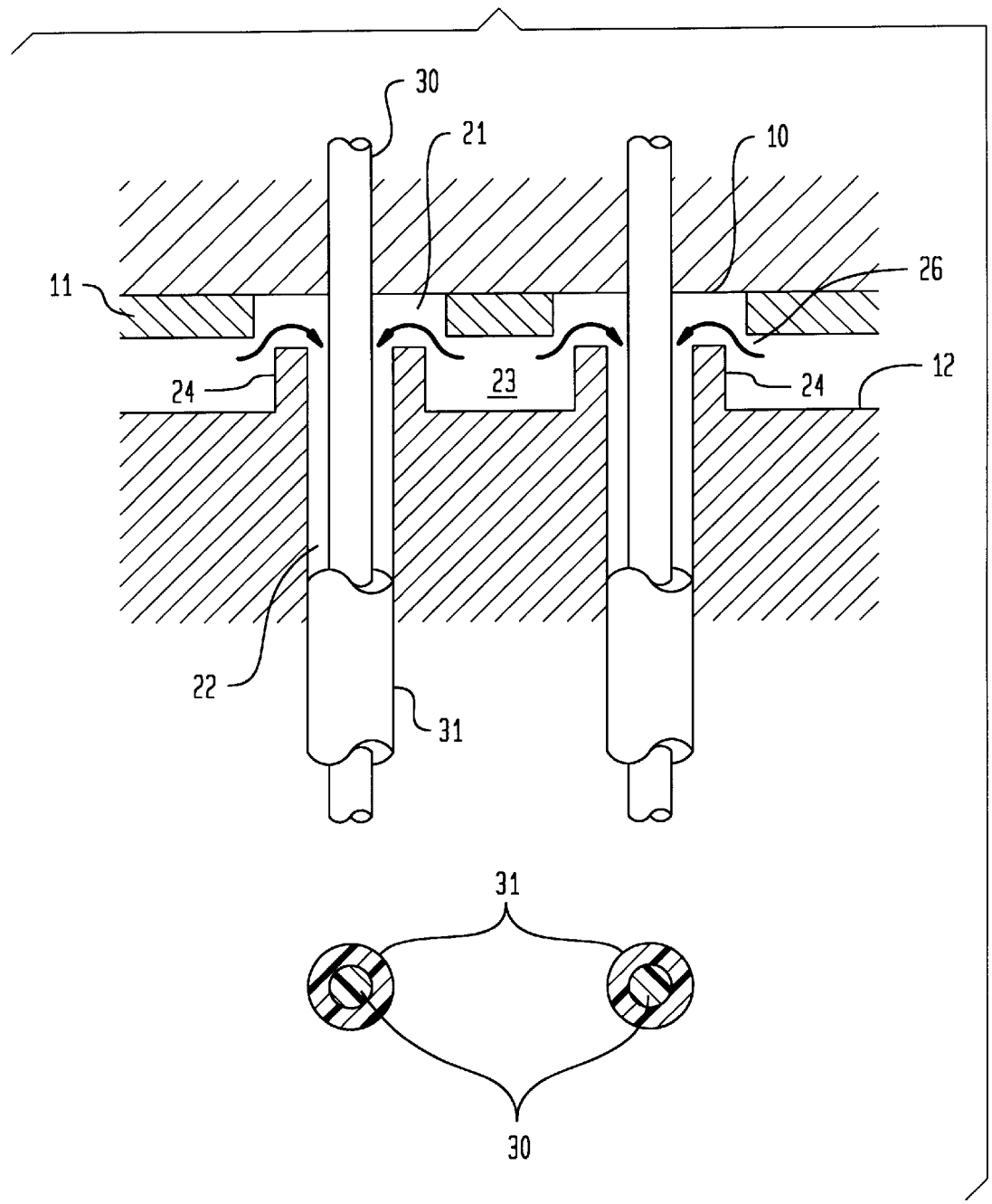
FIG. 3 is a detail in vertical section of a distributor/shim/spinneret assembly to produce concentric sheath/core heterofilaments.

The production of concentric hererofilament fibers is further illustrated in FIG. 3. shim 11 is positioned to cause sheath material 31 flowing through channel 23, over buttons 24, and through gap 26 into channel 22, forming a concentric sheath about core material polymer 30 as shown.

A sheath polymer and thermoplastic elastomer mixture for the sheath may be meltblended and pelletized prior to extrusion, or a sheath polymer and thermoplastic elastomer may be simply added to the extrusion apparatus in appropriate proportions. The extrusion process melt-blends the components.

Following extrusion from apparatus 10, indicated generally in FIG. 4 as apparatus 110, the multiple filaments 120 are melt spun under relatively high stress spinning conditions as described in U.S. Pat. No. 4,101,525 (i.e. a melt drawn down of at least 100:1 and as high as 3000:1, preferably 500:1 to 2000:1). The molten extrudate is solidified in the solidification zone, indicated generally at 130. Following melt solidification, the bilayer filaments are passed between rollers schematically represented as 140, 150 while being treated with steam the solid filaments are further drawn, preferably in multiple drawing steps if so desired, to impart the highest modulus and tenacity to the filaments. Most preferably, the yarn is melt-fused in oven 160 under tension at a suitable temperature to provide the multi-filament structure shown at 200, subsequent to the drawing step.

In one aspect of the present invention, three-component bilayer filaments of the present invention have a sheath: core weight ratio of from about 2:98 to about 30:70 where the sheath contains a compatabilizing polymer and a rubber. From about 5:95 to 25:75 is more typical and from 10:90 to about 20:80 sheath/core weight ratio may be preferred. A sheath composition may be predominately rubber or predominately polymer. A rubber: polymer ratio in the sheath from 99:1 to 1:99 is possible, with from 95:5 to 5:95 more typical. From 70:30 to 30:70 may be the most preferred ratio in the sheath depending on the composition. Following the procedures described above, fused cord having the composition indicated below in Table 3 is produced.

TABLE 3

Fused Cord Compositions

| A<br>Core Polymer | B<br>Sheath Polymer | C<br>Sheath Rubber | Weight<br>Ratio<br>A:B:C |
|---|---|---|---|
| Poly(ethylene terephthalate) | Ex. 1 Polyester | Kraton D-1111 | 80:5:15 |
| Poly(ethylene terephthalate) | Ex. 2 Polyester | Kraton D-1102 | 80:15:5 |
| Poly(ethylene terephthalate) | Melt blend, equal parts of poly(ethylene terephthalate) and copolyester of Example 3 | Kraton D-1147 | 80:10:5 |
| Poly(ethylene terephthalate-co-bibenzoate) | Ex. 4 Polyester | Kraton G-1652 | 80:5:15 |
| Poly(ethylene terephthalate) | Copolyester of Example 1 | Melt-blend of polyisoprene and styrene butadiene rubber, equal part by weight | 75:15:10 |
| Poly(ethylene terephthalate) | Copolyester of Example 2 | Polyisoprene | 80:10:10 |

In another aspect of the present invention, bicomponent fibers are made consisting of a core of a linear polyester of an alkyl glycol and an aromatic diacid and sheath of the functionally terminated polymers described above. The bicomponent fibers are subsequently calendered with rubber. Such bilayer filaments have a sheath core ratio of from about 2:98 to about 30:70, from about 10:95 to about 25:75 being more typical and about 15:85 to about 20:80 perhaps being preferred.

We claim:

1. A reinforced rubber composite comprising a rubber component and a bicomponent fiber in adherent contact therewith, said bicomponent fiber having a core of a linear polyester of an alkyl glycol and an aromatic diacid and disposed thereabout a sheath of an unsaturated acid-terminated or an isocyanate-terminated polyester consisting essentially of the structural formula:

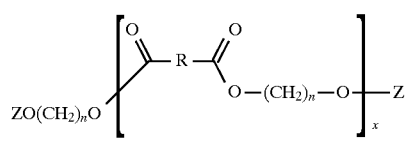

wherein Z represents the reaction residue of diisocyanate or an unsaturated acid with a hydroxy terminated polyester and wherein x is an integer indicating the number of polyester repeating units and is any integer from 5 and above, R is an arylene unit and n is an integer from 2 to 10.

2. The reinforced rubber composite according to claim 1, wherein n=4.

3. The reinforced rubber composite according to claim 1, wherein R is selected from the group consisting of para phenylene, 1,3-phenylene, 4,4'-bibenzylene, 2,6-naphthalene and mixtures thereof.

4. The reinforced rubber composite according to claim 1, wherein said linear polyester is poly(ethylene terephthalate).

5. The reinforced rubber composite according to claim 1, wherein said linear polyester is poly(ethylene terephthalate-co-4,4'-bibenzoate).

6. The reinforced rubber composite according to claim 1, wherein said linear polyester is poly(ethylene terephthalate-co-2,6 naphthalene-dicarboxylate).

7. The reinforced rubber composite according to claim 1, wherein said linear polyester is poly(ethylene 4,4'-bibenzoate-co-2,6-naphthalene-dicarboxylate).

8. The reinforced rubber composite according to claim 1, wherein said rubber component is selected from the group consisting of natural rubber, synthetic polyisoprene rubber, polybutadiene rubbers, styrene-butadiene rubbers, styrene-isoprene rubbers and mixtures thereof.

9. The reinforced rubber composite according to claim 1, wherein said rubber component comprises a thermoplastic elastomer.

10. The reinforced rubber composite according to claim 9, wherein said thermoplastic elastomer is a poly(styrene-elastomer-styrene) polymer.

11. A heterofilament comprising a core of a linear polyester of an alkyl glycol and an aromatic diacid, said core having disposed thereabout a sheath comprising a thermoplastic elastomer melt blended with an unsaturated acid-terminated or an isocyanate-terminated polyester consisting essentially of the structural formula:

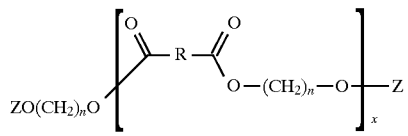

wherein Z represents the reaction residue of a diisocyanate or unsaturated acid with a bydroxy terminated polyester, and wherein further x is an integer indicating the number of polyester repeating units and is any integer from 5 and above, R is an arylene unit and n is an integer from 2 to 10.

12. The filament according to claim 11, wherein said thermoplastic elastomer is a poly(styrene-elastomer-styrene) polymer.

* * * * *